Aug. 19, 1952  C. E. SNYDER  2,607,392
INNER TUBE CONSTRUCTION
Filed April 23, 1949
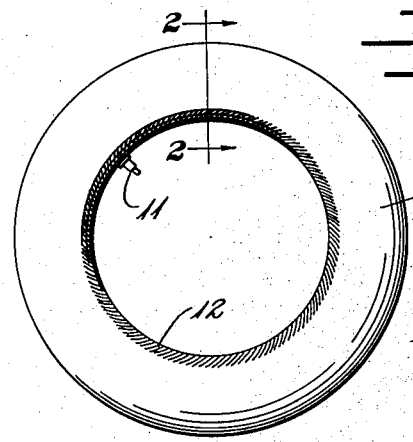
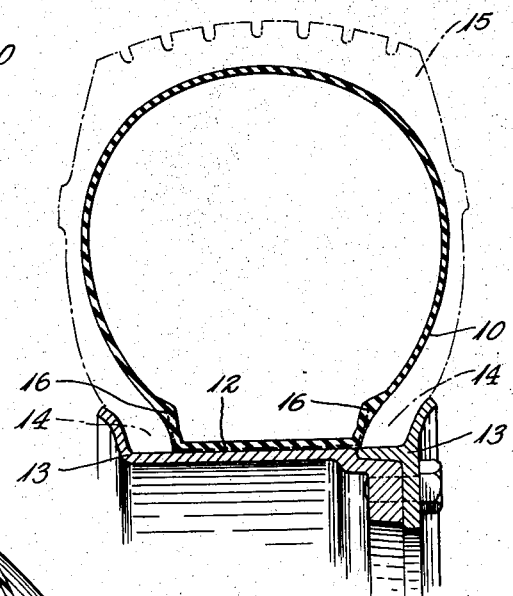
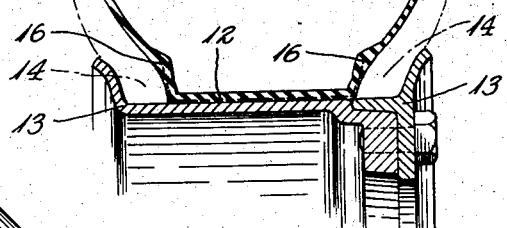
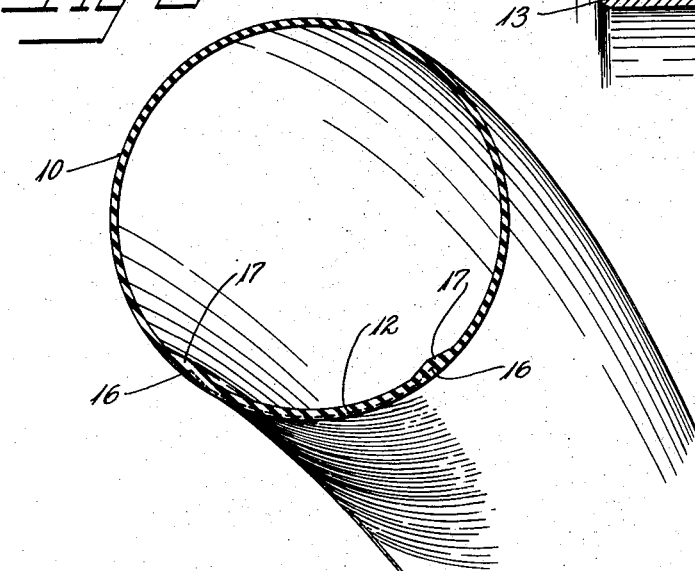
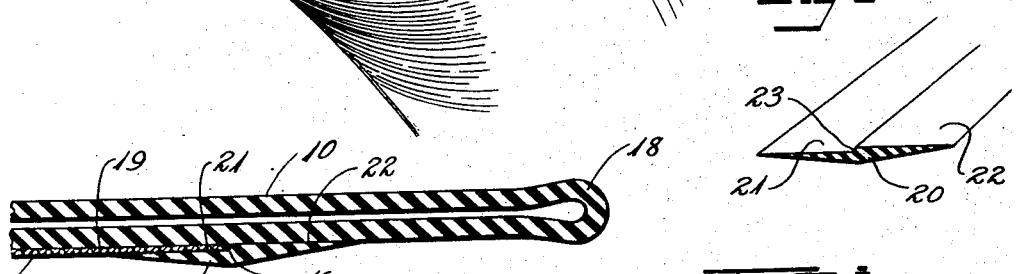
Inventor
Clarence E. Snyder Patented Aug. 19, 1952

2,607,392

UNITED STATES PATENT OFFICE 2,607,392

INNER TUBE CONSTRUCTION

Clarence E. Snyder, Akron, Ohio, assignor to The B. F. Goodrich Company, New York, N. Y., a corporation of New York Application April 23, 1949, Serial No. 89,263

8 Claims. (Cl. 152—350)

1

This invention relates to inner tubes and to the manufacture thereof, and especially to inner tubes such as are used on aircraft which are subject to high impact forces and have reinforcements disposed at the inner faces for protecting the inner tubes from chafing and other damage in use and installation.

Such reinforcements, usually of cord fabric, have been built into the rim-side faces of the inner tubes to protect the tubes from chafing damage caused by the rocking of the tire beads under excessive impact forces. However prior reinforcements have resulted in the difficulty of weakness in the inner tubes at the edges of the reinforcing fabric because of the localized stresses concentrated in the tube wall at the termination of the fabric where the rubber is often abruptly and severely stretched. Also, difficulty has been encountered because of the trapping of air in this region during the building.

Objects of the invention are to provide for overcoming and avoiding the foregoing and other difficulties, to provide an improved reinforced inner tube construction, to provide with a chafer reinforcement a reinforcing strip which will strengthen the inner tube at the edges of the reinforcing band without introducing the objectionable characteristics discussed hereinabove, to provide improved distribution of the stresses within the inner tube at the edges of the reinforcing band, and to facilitate manufacture of the inner tube.

These and other objects will be apparent from the following description, reference being had to the drawings in which:

Fig. 1 is an elevation of an inner tube constructed in accordance with and embodying the invention.

Fig. 2 is a section in perspective taken along line 2—2 of Fig. 1.

Fig. 3 is a section of the tube shown in Fig. 1 mounted on a rim within a tire shown in broken lines.

Fig. 4 is a sectional view on an enlarged scale of the tube prior to vulcanization showing the construction of the base portion.

Fig. 5 is a section in perspective of the rubber reinforcing strip shown in Fig. 4.

With reference to the drawing, an inner tube 10 constructed in accordance with and embodying the invention is shown in Fig. 1. The inner tube 10 of the invention has a hollow toroidal shape and walls of resilient rubber-like material such as natural rubber or a synthetic rubber such as butyl rubber. The tube has a valve stem 11 mounted thereon through which the tube may be inflated and deflated.

As shown in Fig. 2 a reinforcement 12 to resist chafing action is disposed at the rim side face of the inner tube 10, secured to and partially embedded in the rubber, and may be of a suitable reinforcing fabric such as woven rayon, nylon or cotton. The fabric of the reinforcement 12 is preferably cut and mounted on the bias and extends circumferentially of the inner tube at the surface which engages rim 13 of a supported wheel and engages bead portions 14, 14 of an enclosing tire 15 as shown in Fig. 3.

The reinforcement 12 has edges 16, 16 which are embedded in thickened portions 17, 17 of the inner tube 10 so that the edges are covered by substantially thick layers of resilient rubber material of the tube to distribute stresses which develop at the edges during operation, and avert objectionable localized stresses in this region. The thickened portions 17, 17 of the inner tube 10 are thickest at the sections closest to the edges 16, 16 of the reinforcement 12 and the sections of the portions 17, 17 are reduced in thickness in small increments as the sections become more remote from the edges of the reinforcement until the standard thickness of the inner tube wall is reached at the edges of the thickened portion. In this manner a tapered construction is provided which effectively distributes the stresses developed at the edges 16, 16 of the reinforcement 12 and provides a smooth surface of the inner tube 10 without the introduction of weakening irregularities.

In construction of the inner tube 10 of the invention a tubular body 18 of resilient rubber or other rubber-like material may be formed in a suitable manner such as by extrusion. The reinforcement 12 is preferably prepared by frictioning the resilient rubber on a bias cut band 19 of suitable fabric such as nylon, rayon or cotton after which the band may be adhesively applied to the face of the tubular body 18 and suitably adhered thereto as by cementing.

A reinforcing strip 20 which is constructed in accordance with and embodying the invention is shown in Fig. 5 in the form prior to vulcanization, and is adapted to be applied in overlapping relation along the edges 16, 16 of the reinforcement 12 as shown in Fig. 4. The reinforcing strip 20 is preferably of the same rubber material as the inner tube and has an inner tube engaging face in which there is a flat portion 21 and another flat portion 22 separated by a step 23 of a depth corresponding with the thickness of the reinforcement 12. The step 23 makes possible the reception of the fabric 12 upon the flat portion 21 of the strip 20 so that the reinforcement 12 will lie substantially flush with the other flat portion 22 of the strip 20. The reinforcing strip is thereby mounted over the edges 16, 16 of the fabric band 19 and may be rolled and pressed into place without leaving any air spaces between the tubular body 18 and strip 20. The strip 20 is thick in the section containing the step 23 and gradually decreases in thickness at the sections more remote from the step providing a tapered construction as shown in Fig. 5.

After the reinforcing strips 20, 20 are adhesively applied to the tubular body 18 in overlapping relation with the edges 16, 16 of the reinforcing fabric 19, the two ends of the tubular body are attached in abutting relation in a suitable manner as by butt splicing. The assembled tube 10 then may be cured and vulcanized in any suitable manner, preferably in a mold under fluid pressure within the tube.

As a result of the close fit of the strip 20 over the edge of the fabric as provided by the step 23 in the face of the strip and the graduated thickness of the strip from the central region to its margin, the possibility of air being trapped at this joint is minimized and the disposition of the rubber in the region at the edge of the fabric 19 is effective in distributing stresses in the molded tube and avoiding objectionable localized concentrations thereof for obtaining maximum life of the tube even though it be subjected to high impact stresses in use with the accompanying chafing action from rocking action of the beads under extreme contraction of the tire.

Variations may be made without departing from the scope of the invention as it is defined in the following claims.

I claim:

1. An inflatable tire inner tube comprising a body of resilient rubber material having a reinforcement secured to and forming a part of said body at the rim side face thereof and terminating in an edge disposed in the tire bead region of the tube, and a reinforcing strip of resilient rubber material having in its shape prior to vulcanization a stepped face, said strip being disposed with said edge of the reinforcement in the step of said strip and being united with said body by vulcanization under molding pressure.

2. An inflatable tire inner tube comprising a body of resilient rubber material having a fabric chafer reinforcement secured to and forming a part of said body at the rim-side face thereof extending across and along said face and terminating in an edge disposed in the tire bead region of the tube, and a reinforcing strip of resilient rubber material having in its shape prior to vulcanization a stepped face, said strip being disposed with said edge of the fabric in the step of said strip and being united with said body by vulcanization under molding pressure.

3. An inflatable tire inner tube comprising a body of resilient rubber material having a fabric chafer reinforcement secured to and forming a part of said body at the rim-side face thereof extending across and along said face and terminating in an edge disposed in the tire bead region of the tube, and a reinforcing strip of resilient rubber material having in its shape prior to vulcanization a thick central portion and at a face thereof having a stepped face, said strip being disposed with said edge of the fabric in the step of said strip and being united with said body by vulcanization, and said strip tapering from said thick central portion to thin edges at the margins of the strip.

4. An inner tube reinforcing strip for overlapping disposition at the edges of a reinforcement disposed at the rim-side face of the inner tube and said reinforcing strip having a relatively thick stepped recessed portion for receiving an edge of the reinforcement in flush relation.

5. An inner tube reinforcing strip for overlapping disposition at the edges of a reinforcement disposed at the rim-side of the inner tube, said reinforcing strip comprising an elongated strip of rubber material not fully vulcanized having a relatively thick central portion and a face thereof having at said central portion a stepped portion with the step extending longitudinally of said strip and an adjacent recessed portion for receiving an edge of the reinforcement in flush relation.

6. An inner tube reinforcing strip for overlapping disposition at the edges of a reinforcement disposed at the rim-side face of the inner tube, said reinforcing strip comprising an elongated strip of rubber material not fully vulcanized having a relatively thick central portion and at a face thereof having at said central portion a stepped portion with the step extending longitudinally of said strip and an adjacent recessed portion for receiving an edge of the reinforcement in flush relation, said elongated strip tapering from said thick central portion to thin edges at the margins of the strip.

7. The method of making an inflatable tire inner tube which comprises forming a body of rubber material, incorporating therein at the rim-side face thereof a reinforcement with an edge thereof disposed in the tire bead region of the tube, forming a reinforcing strip of rubber-like material having a stepped face, applying said strip to said body with said edge of said reinforcement disposed in the step of said strip, and vulcanizing the assembly under molding pressure thereby uniting said strip with said body.

8. A method of making an inflatable tire inner tube which comprises forming an open-ended tubular body of resilient rubber material, incorporating therein at a face thereof a fabric band with edges disposed at the face in the tire bead region of the tube, forming a reinforcing strip of rubber-like material having a face with a stepped portion thereon, applying said strip in adhered relation to said body with an edge of said fabric band disposed in the step of said strip in substantially flush condition with said step, splicing the ends of the reinforced tubular body and vulcanizing the assembly under molding pressure thereby uniting said strip with said body.

CLARENCE E. SNYDER.

REFERENCES CITED

The following references are of record in the file of this patent:

UNITED STATES PATENTS

| Number | Name | Date |
|---|---|---|
| 467,502 | Gray | Jan. 26, 1892 |
| 497,971 | Tillinghast | May 23, 1893 |
| 554,711 | Moomy | Feb. 18, 1896 |
| 1,162,745 | Blodgett | Dec. 7, 1915 |
| 1,252,107 | Haigler | Jan. 1, 1918 |
| 1,474,085 | Meredith | Nov. 13, 1923 |
| 1,822,568 | Eger | Sept. 8, 1931 |

FOREIGN PATENTS

| Number | Country | Date |
|---|---|---|
| 484,503 | France | Oct. 16, 1917 |